(12) United States Patent
Bush et al.

(10) Patent No.: US 11,198,418 B2
(45) Date of Patent: Dec. 14, 2021

(54) METHOD AND SUBSYSTEM FOR CONTROLLING AN AUTONOMOUS BRAKING SYSTEM FOR A VEHICLE

(71) Applicant: GM GLOBAL TECHNOLOGY OPERATIONS LLC, Detroit, MI (US)

(72) Inventors: Lawrence A. Bush, Shelby Township, MI (US); Zachariah E. Tyree, Shelby Charter Township, MI (US); Prabhjot Kaur, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 225 days.

(21) Appl. No.: 16/687,931

(22) Filed: Nov. 19, 2019

(65) Prior Publication Data

US 2021/0146896 A1    May 20, 2021

(51) Int. Cl.
| | |
|---|---|
| *B60T 7/12* | (2006.01) |
| *B60T 8/174* | (2006.01) |
| *B60K 31/00* | (2006.01) |
| *B60T 8/171* | (2006.01) |
| *B60Q 1/44* | (2006.01) |
| *H04W 4/46* | (2018.01) |
| *B60Q 9/00* | (2006.01) |

(52) U.S. Cl.
CPC .......... *B60T 8/174* (2013.01); *B60K 31/0008* (2013.01); *B60Q 1/44* (2013.01); *B60Q 9/008* (2013.01); *B60T 7/12* (2013.01); *B60T 8/171* (2013.01); *H04W 4/46* (2018.02); *B60K 2031/0025* (2013.01); *B60K 2031/0033* (2013.01); *B60T 2201/02* (2013.01); *B60T 2210/32* (2013.01); *B60T 2250/04* (2013.01)

(58) Field of Classification Search
CPC ............ B60T 8/174; B60T 7/12; B60T 8/171; H04W 4/46; B60K 31/0008; B60Q 1/44; B60Q 9/008
See application file for complete search history.

(56) References Cited

U.S. PATENT DOCUMENTS

| | | | | |
|---|---|---|---|---|
| 6,044,321 | A * | 3/2000 | Nakamura | ......... B60K 31/0008 180/179 |
| 2015/0012204 | A1* | 1/2015 | Breuer | ................ B60R 21/0134 701/96 |
| 2019/0001985 | A1* | 1/2019 | Jerger | ................ B60W 10/184 |

* cited by examiner

*Primary Examiner* — Adam M Alharbi
(74) *Attorney, Agent, or Firm* — Quinn IP Law

(57) ABSTRACT

A control system for a subject vehicle includes an autonomous braking system, a forward monitoring sensor and a rearward monitoring sensor. The controller monitors a first speed of a first vehicle travelling in front of the subject vehicle and a second speed of a second vehicle travelling to the rear of the subject vehicle. A first gap-closing time is determined based upon the speed of the subject vehicle and the first speed of the first vehicle. A second gap-closing time is determined based upon the speed of the subject vehicle and the second speed of the second vehicle. The controller controls the speed of the subject vehicle based upon the first gap-closing time and the second gap-closing time when one of the first gap-closing time or the second gap-closing time is less than a first threshold time.

20 Claims, 3 Drawing Sheets

METHOD AND SUBSYSTEM FOR CONTROLLING AN AUTONOMOUS BRAKING SYSTEM FOR A VEHICLE

INTRODUCTION

Vehicles employ braking systems to reduce vehicle speed and stop vehicle movement. Some vehicles may employ some form of forward monitoring and braking assistance, wherein an on-vehicle system and devices monitor an area forward of the vehicle. Such forward monitoring and braking assistance systems may detect a potential event forward of the vehicle, notify a vehicle operator of the potential event, supplement an operator braking request, and/or control the braking system in response to the potential event forward of the vehicle.

There may be a benefit to vehicle operation that includes a rearward monitoring system to monitor an area rearward of the vehicle to detect a potential event rearward of the vehicle and control a braking assistance system in response to a potential event rearward of the vehicle and a potential event forward of the vehicle.

SUMMARY

A control system for a subject vehicle is described, and includes an autonomous braking system, a forward monitoring sensor and a rearward monitoring sensor. A controller is in communication with the forward monitoring sensor and the rearward monitoring sensor, and is operatively connected to the autonomous braking system. The controller includes an instruction set that is executable to determine a speed of the subject vehicle. The controller monitors, via the forward monitoring sensor, a first speed of a first vehicle travelling in front of the subject vehicle, and monitors, via the rearward monitoring sensor, a second speed of a second vehicle travelling to the rear of the subject vehicle. A first gap-closing time is determined based upon the speed of the subject vehicle and the first speed of the first vehicle, wherein the first gap-closing time is associated with a first gap between the subject vehicle and the first vehicle. A second gap-closing time is determined based upon the speed of the subject vehicle and the second speed of the second vehicle, wherein the second gap-closing time is associated with a second gap between the subject vehicle and the second vehicle. The controller controls, via the autonomous braking system, the speed of the subject vehicle based upon the first gap-closing time and the second gap-closing time when one of the first gap-closing time or the second gap-closing time is less than a first threshold time.

An aspect of the disclosure includes the instruction set being executable to control, via the autonomous braking system, the speed of the subject vehicle such that the first gap-closing time equals a minimum threshold time at the same time that the second gap-closing time equals the minimum threshold time.

Another aspect of the disclosure includes the forward monitoring sensor and the rearward monitoring sensor being a single sensor.

Another aspect of the disclosure includes the single sensor arranged to monitor the travel lane that is forward of the subject vehicle and to the rear of the subject vehicle being a lidar sensor.

Another aspect of the disclosure includes the single sensor arranged to monitor the travel lane forward of the subject vehicle and rearward of the subject vehicle being a radar sensor.

Another aspect of the disclosure includes the forward monitoring sensor and the rearward monitoring sensor each being a radar sensor, a lidar sensor, or a camera.

Another aspect of the disclosure includes a rearward-facing braking event lamp, wherein the controller is operatively connected to the braking event lamp, and wherein the instruction set is executable to illuminate the braking event lamp when the second gap-closing time is less than the first threshold time.

Another aspect of the disclosure includes a driver's seat being disposed in the subject vehicle and including a haptic device, wherein the controller is operatively connected to the haptic device, and wherein the instruction set is executable to activate the haptic device when the second gap-closing time is less than the threshold time.

Another aspect of the disclosure includes a vehicle-to-vehicle (V2V) communication system, wherein the instruction set is executable to communicate, via the V2V communication system, with the first vehicle and the second vehicle based upon the first gap-closing time and the second gap-closing time.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

One or more embodiments will now be described, by way of example, with reference to the accompanying drawings, in which.

The appended drawings are not necessarily to scale and may present a somewhat simplified representation of various features of the present disclosure as disclosed herein, including, for example, specific dimensions, orientations, locations, and shapes. Details associated with such features will be determined in part by the intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

The drawings are in simplified form and are not to precise scale. For purposes of convenience and clarity, directional terms such as top, bottom, left, right, up, over, above, below, beneath, rear, rearward, front, and forward may be used with respect to the drawings. These and similar directional terms are not to be construed to limit the scope of the disclosure. Furthermore, the disclosure, as illustrated and described herein, may be practiced in the absence of an element that is not specifically disclosed herein.

As used herein, the term "system" refers to mechanical and electrical hardware, software, firmware, electronic control components, processing logic, and/or processor devices, individually or in combination, that provide the described functionality. This may include, without limitation, an application specific integrated circuit (ASIC), an electronic circuit, a processor (shared, dedicated, or group) that executes one or more software or firmware programs, memory to contain software or firmware instructions, a combinational logic circuit, and/or other components.

Figure 1:
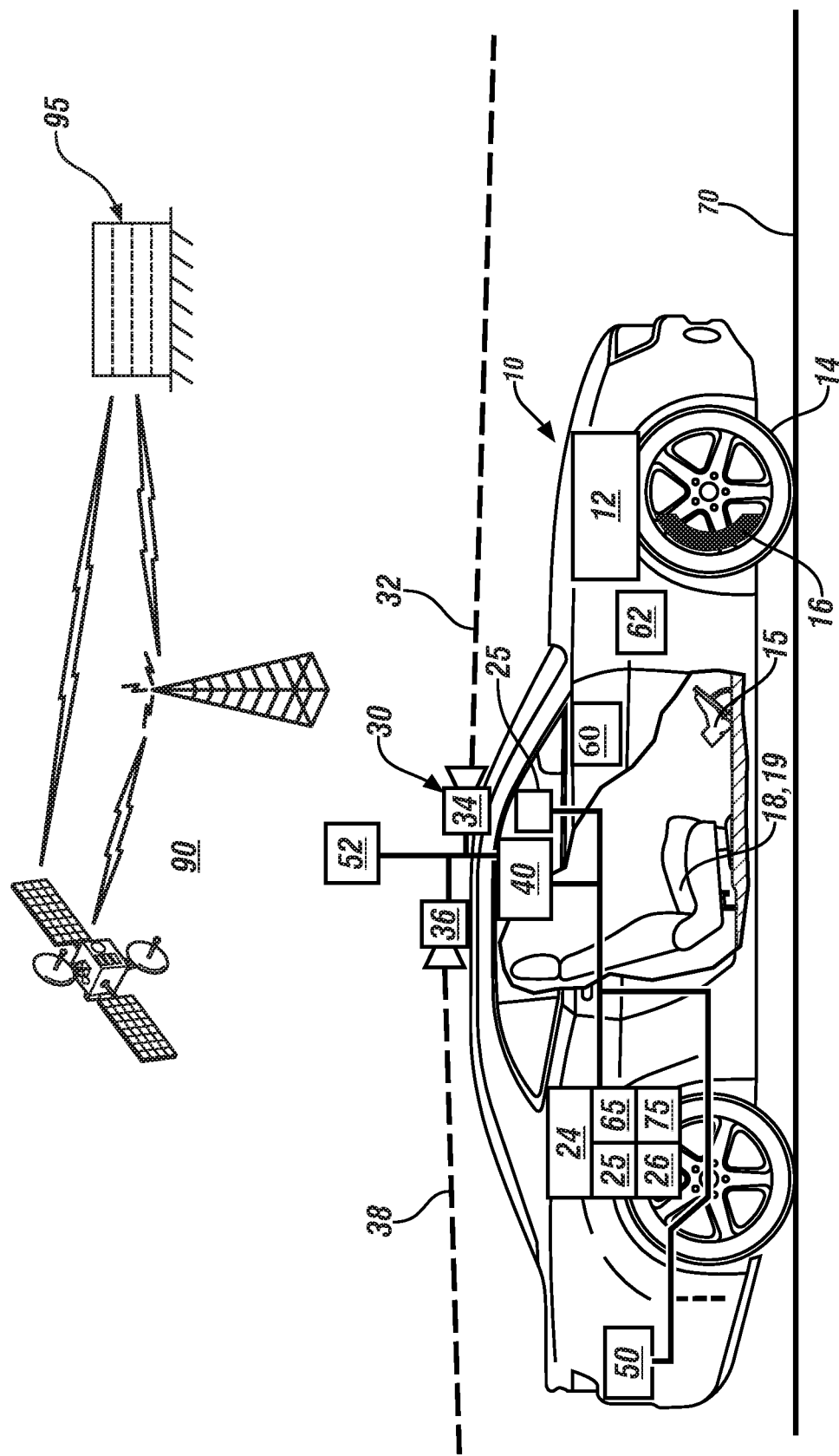
FIG. 1 schematically illustrates a side-view of a vehicle that includes an autonomous braking system and a spatial sensor, in accordance with the disclosure.
Figure 2:
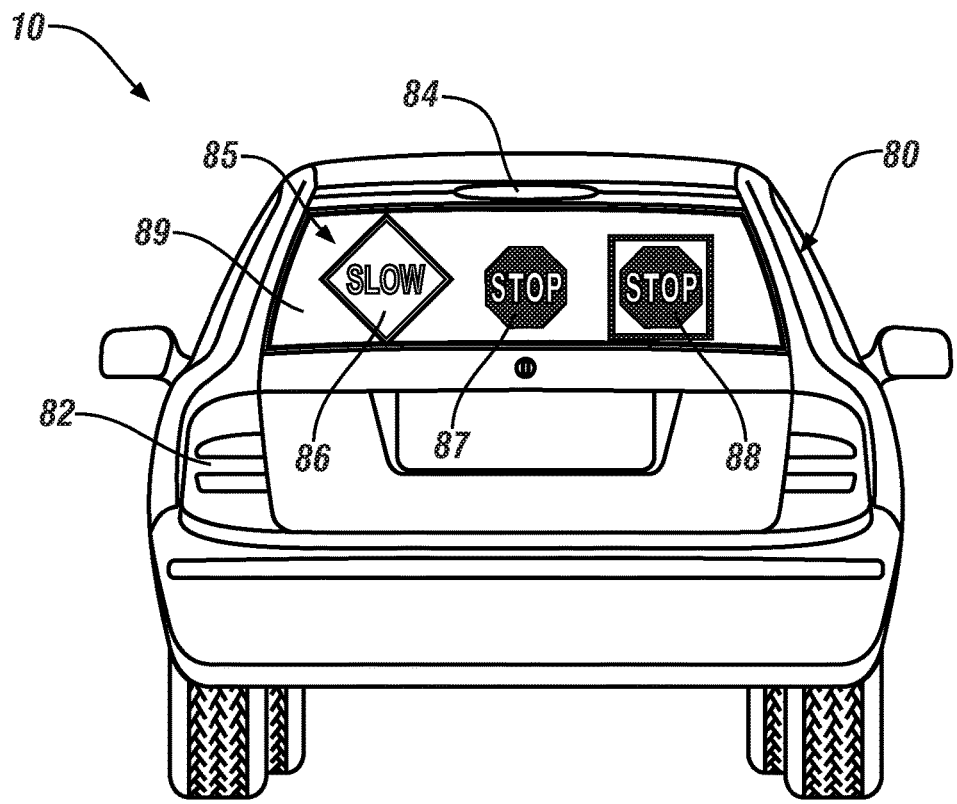
FIG. 2 schematically illustrates a rear-view of a vehicle that includes a rearward-facing braking event lamp, in accordance with the disclosure.

Referring to the drawings, wherein like reference numerals correspond to like or similar components throughout the several Figures, FIGS. 1 and 2, consistent with embodiments disclosed herein, schematically illustrate a side-view and a rear-view, respectively of a vehicle 10 that is disposed on and able to traverse a travel surface 70 such as a paved road surface. The vehicle 10 includes a propulsion system 12 that generates and transfers torque to one or a plurality of vehicle wheels 14, and a wheel braking system 16 that is capable of applying braking torque to the vehicle wheels 14. Operation of the wheel braking system 16 may be controlled by an operator brake pedal 15 and by an autonomous braking system 62. The vehicle 10 also includes a spatial monitoring system 30 including a spatial monitoring controller 40, and a vehicle controller 50. The vehicle 10 also includes an operator seat 18, which may include a haptic device 19 that is controllable by the vehicle controller 50. Alternatively, or in addition, the haptic device 19 may be disposed in a vehicle steering wheel, a wearable device, or at another location that is proximal to the vehicle operator. The vehicle 10 may also include, in various embodiments, an on-board navigation system 24, a computer-readable storage device or media 26, a digitized roadway map 25, a global positioning system (GPS) sensor 52, a human/machine interface (HMI) device 60, an autonomous controller 65 and a telematics controller 75. The vehicle 10 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

In one embodiment, the spatial monitoring system 30 includes one or a plurality of spatial sensors 34, 36 that are arranged to monitor a viewable region that includes a first viewable region 32 forward of the vehicle 10 and a second viewable region 38 rearward of the vehicle 10, and are in communication with the spatial monitoring controller 40. The first viewable region 32 includes an area that is forward of the vehicle 10 including a travel lane that is forward of the vehicle 10, and the second viewable region 38 includes an area that is rearward of the vehicle 10 including the travel lane that is rearward of the vehicle 10. The spatial sensors 34, 36 that are arranged to monitor the first and second viewable regions 32, 38 include, e.g., one or multiple lidar sensors, one or multiple radar sensors, one or multiple digital cameras, etc. A lidar sensor employs a pulsed and reflected laser beam to measure range or distance to an object. A radar sensor employs radio waves to determine range, angle, and/or velocity of an object. In one embodiment, lidar sensors and radar sensors may be capable of rotating to monitor a 360° field of view. As such, the spatial monitoring system 30 may be arranged to employ a single spatial sensor to monitor the viewable region including the first viewable region 32 forward of the vehicle 10 and the second viewable region 38 rearward of the vehicle 10. More specifically, the spatial sensors 34, 36 of the spatial monitoring system 30 may include object-locating sensing devices including range sensors, such as FM-CW (Frequency Modulated Continuous Wave) radars, pulse and FSK (Frequency Shift Keying) radars, and Lidar (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other camera/video image processors which utilize digital photographic methods to 'view' forward objects including one or more vehicle(s).

Each of the spatial sensors 34, 36 is disposed on-vehicle to monitor all or a portion of the first and second viewable regions 32, 38 to detect proximate remote objects such as vehicles that are forward of the subject vehicle 10 and in the same lane of travel, and vehicles that are rearward of the subject vehicle 10 and in the same lane of travel. Other elements disposed in the viewable region 32 that may also be monitored by the spatial sensors 34, 36 include road features, lane markers, buildings, pedestrians, road signs, traffic control lights and signs, other vehicles traveling in other lanes of travel, including in the same direction or in the opposite direction, and geographic features that are proximal to the vehicle 10. The spatial monitoring controller 40 may generate digital representations of the viewable region 32 based upon data inputs from the spatial sensors 34, 36. The spatial sensors 34, 36 can be located at various locations on the vehicle 10, including, e.g., the front corners, rear corners, rear sides, mid-sides, roof, etc. The spatial sensors 34, 36 can include a front radar sensor and a camera in one embodiment, although the disclosure is not so limited. Placement of the spatial sensors 34, 36 permits the spatial monitoring controller 40 to monitor traffic flow including proximate vehicles, intersections, lane markers, and other objects around the vehicle 10. Data generated by the spatial monitoring controller 40 may be employed by a lane marker detection processor (not shown) to estimate the roadway. The spatial monitoring controller 40 includes software and control routines for evaluating inputs from the spatial sensors 34, 36 to determine a linear range, relative speed, and trajectory of the vehicle 10 in view of each proximate remote object, including the areas that are forward and rearward of the vehicle 10 that include the first and second viewable regions 32, 38.

Driving automation includes hardware and controllers configured to monitor the spatial environment under various driving modes to perform various driving tasks during dynamic vehicle operation. In one embodiment, an autonomous controller 65 is configured to implement autonomous driving or advanced driver assistance system (ADAS) vehicle functionalities. Driving automation can include a range of dynamic driving and vehicle operation. Driving automation can include some level of automatic control or intervention related to a single vehicle function, such as steering, acceleration, and/or braking, with the driver continuously having overall control of the vehicle 10. Driving automation can include some level of automatic control or intervention related to simultaneous control of multiple vehicle functions, such as steering, acceleration, and/or braking, with the driver continuously having overall control of the vehicle 10. Driving automation can include simultaneous automatic control of vehicle driving functions that include steering, acceleration, and braking, wherein the driver cedes control of the vehicle for a period of time during a trip. Driving automation can include simultaneous automatic control of vehicle driving functions, including steering, acceleration, and braking, wherein the driver cedes control of the vehicle 10 for an entire trip. The terms 'driver' and 'operator' describe the person responsible for directing operation of the vehicle 10, whether actively involved in controlling one or more vehicle functions or directing autonomous vehicle operation.

The autonomous vehicle functions include, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of lane guidance, lane keeping and lane change operations, etc. As such, the braking command can be generated by the autonomous controller 65 independently from an action by the vehicle operator and in response to an autonomous control function.

The autonomous braking system 62 may be an element of an advanced driver assistance system (ADAS), which is an on-vehicle control system that is capable of providing a level of driving automation. Operation of the autonomous braking system 62 may be controlled by a braking controller, which may be integrated into or controlled by the autonomous controller 65 in one embodiment. Driving automation can include, by way of non-limiting examples, cruise control, adaptive cruise control, lane-change warning, intervention and control, automatic parking, acceleration, braking, and the like.

Operator controls may be disposed in the passenger compartment of the vehicle 10 and may include, by way of non-limiting examples, a steering wheel, an accelerator pedal, the brake pedal 15 and an operator input device that is an element of the HMI device 60. The operator controls enable a vehicle operator to interact with and control operation of the vehicle 10.

The HMI device 60 provides for human/machine interaction, for purposes of directing operation of an infotainment system, the global positioning system (GPS) sensor 52, the navigation system 24 and the like, and includes a controller. The HMI device 60 monitors operator requests and provides information to the operator including status of vehicle systems, service and maintenance information. The HMI device 60 communicates with and/or controls operation of a plurality of operator interface devices, wherein the operator interface devices are capable of transmitting a message associated with operation of one of the autonomic vehicle control systems. The HMI device 60 may also communicate with one or more devices that monitor biometric data associated with the vehicle operator, including, e.g., eye gaze location, posture, and head position tracking, among others. The HMI device 60 is depicted as a unitary device for ease of description, but may be configured as a plurality of controllers and associated sensing devices in an embodiment of the system described herein. Operator interface devices can include devices that are capable of transmitting a message urging operator action, and can include an electronic visual display module, e.g., a liquid crystal display (LCD) device, a heads-up display (HUD), an audio feedback device, and the haptic device 19 of the operator seat 18. The operator interface devices that are capable of urging operator action may be controlled by or through the HMI device 60. The HUD may project information that is reflected onto an interior side of a windshield of the vehicle, in the field-of-view of the operator, including transmitting a confidence level associated with operating one of the autonomic vehicle control systems. The HUD may also provide augmented reality information, such as lane location, vehicle path, directional and/or navigational information, and the like.

The on-board navigation system 24 employs the digitized roadway map 25 for purposes of providing navigational support and information to a vehicle operator. The autonomous controller 65 employs the digitized roadway map 25 for purposes of controlling autonomous vehicle operation or ADAS vehicle functions.

The telematics controller 75 includes a wireless telematics communication system capable of extra-vehicle communications, including communicating with a communication network 90 having wireless and wired communication capabilities. The telematics controller 75 is capable of extra-vehicle communications that includes short-range vehicle-to-vehicle (V2V) communication and/or vehicle-to-everything (V2x) communication, which may include communication with an infrastructure monitor, e.g., a traffic camera. Alternatively or in addition, the telematics controller 75 has a wireless telematics communication system capable of short-range wireless communication to a handheld device, e.g., a cell phone, a satellite phone or another telephonic device. In one embodiment the handheld device is loaded with a software application that includes a wireless protocol to communicate with the telematics controller 75, and the handheld device executes the extra-vehicle communication, including communicating with an off-board server 95 via the communication network 90. Alternatively or in addition, the telematics controller 75 executes the extra-vehicle communication directly by communicating with the off-board server 95 via the communication network 90.

The term "controller" and related terms such as microcontroller, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

A parameter is defined as a measurable quantity that represents a physical property of a device or other element that is discernible using one or more sensors and/or a physical model. A parameter can have a discrete value, e.g., either "1" or "0", or can be infinitely variable in value. The terms "calibration", "calibrated", and related terms refer to a result or a process that compares an actual or standard measurement associated with a device or system with a perceived or observed measurement or a commanded position for the device or system. A calibration as described herein can be reduced to a storable parametric table, a plurality of executable equations or another suitable form that may be employed as part of a measurement or control routine. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

A schematic view of a rear portion 80 of an embodiment of the vehicle 10 is described with reference to FIG. 2, with continued reference to elements that are illustrated in FIG. 1. The rear portion 80 of the vehicle 10 includes brake lamps 82, a center high-mount stop lamp (CHMSL) 84, and a braking event lamp 85. Activations of the brake lamps 82 and center high-mount stop lamp (CHMSL) 84 are controlled by the operator by depressing the brake pedal 15. The braking event lamp 85 may include, in one embodiment, a single device such as an LED screen or a projection device capable of projecting a message onto a rear window 89 or a rear panel of the vehicle 10 that is viewable by an operator of a vehicle traveling behind the subject vehicle 10. The braking event lamp 85 includes an inactive state and an illuminated state. The illuminated state of the braking event lamp 85 may include a first illuminated state 86 (SLOW') indicating the vehicle 10 is slowing, even though wheel braking is not activated. The braking event lamp 85 may include, in one embodiment, a second illuminated state 87 (STOP') indicating the vehicle 10 is stopping, such as may be caused by activation of the autonomous braking with or without the operator depressing the brake pedal 15. The braking event lamp 85 may include, in one embodiment, a third illuminated state 88 (STOP') indicating the vehicle 10 is urgently stopping, with or without the operator depressing the brake pedal 15.

The first, second and third illuminated states 86, 87, 88 may be separate devices, or incorporated into a single device such as an LED screen or a projection device capable of projecting a message onto a rear window or a rear panel of the vehicle 10. Activations of the first, second and third illuminated states 86, 87, 88 of the braking event lamp 85 are controlled to inform drivers of vehicles following the vehicle 10 that the vehicle 10 is braking, in conjunction with and consistent with operation of the brake lamps 82 and the center high-mount stop lamp (CHMSL) 84 that are associated with manual braking via the brake pedal 15. Such activation is described with reference to a state diagram that is described with reference to FIG. 4.

Figure 3:
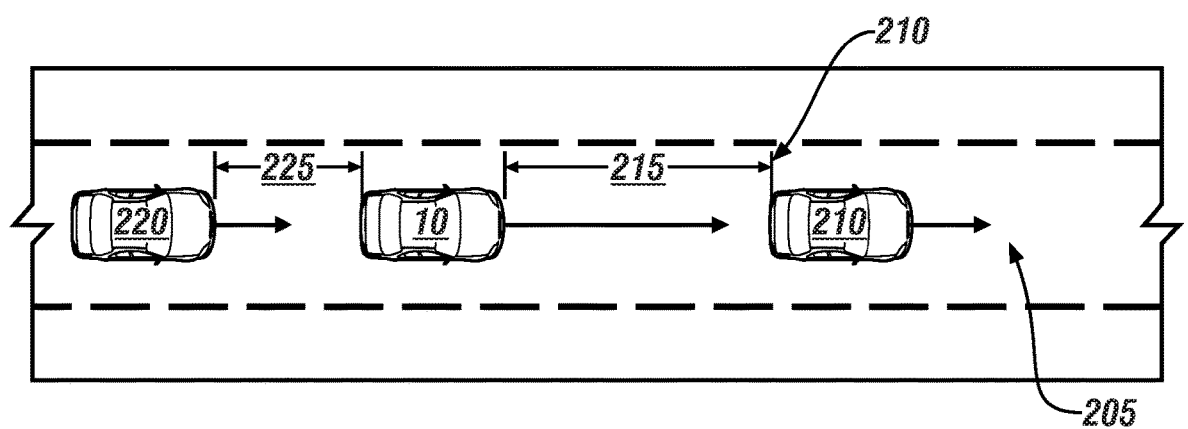
FIG. 3 schematically illustrates a top view of a portion of a roadway that includes a subject vehicle, a first vehicle forward of the subject vehicle, and a second vehicle rearward of the subject vehicle, in accordance with the disclosure.

FIG. 3 schematically illustrates a top-view of a single travel lane 205 of a road surface, including an embodiment of the subject vehicle 10 described with reference to FIG. 1, and proximal vehicles including a first vehicle 210 and a second vehicle 220. The subject vehicle 10, the first vehicle 210 and the second vehicle 220 are traveling in the same direction on the travel lane 205 as shown, although the concepts described herein are not limited to vehicles travelling in the same lane of travel. As shown, the first vehicle 210 is operating in the same lane of travel and is in front of the subject vehicle 10, and the second vehicle 220 is operating in the same lane of travel and is behind the subject vehicle 10. A first gap 215 is located between the subject vehicle 10 and the first vehicle 210, and represents a longitudinal distance from the subject vehicle 10 to the first vehicle 210. A second gap 225 is located between the subject vehicle 10 and the second vehicle 220, and represents a longitudinal distance from the subject vehicle 10 to the second vehicle 220.

Figure 4:
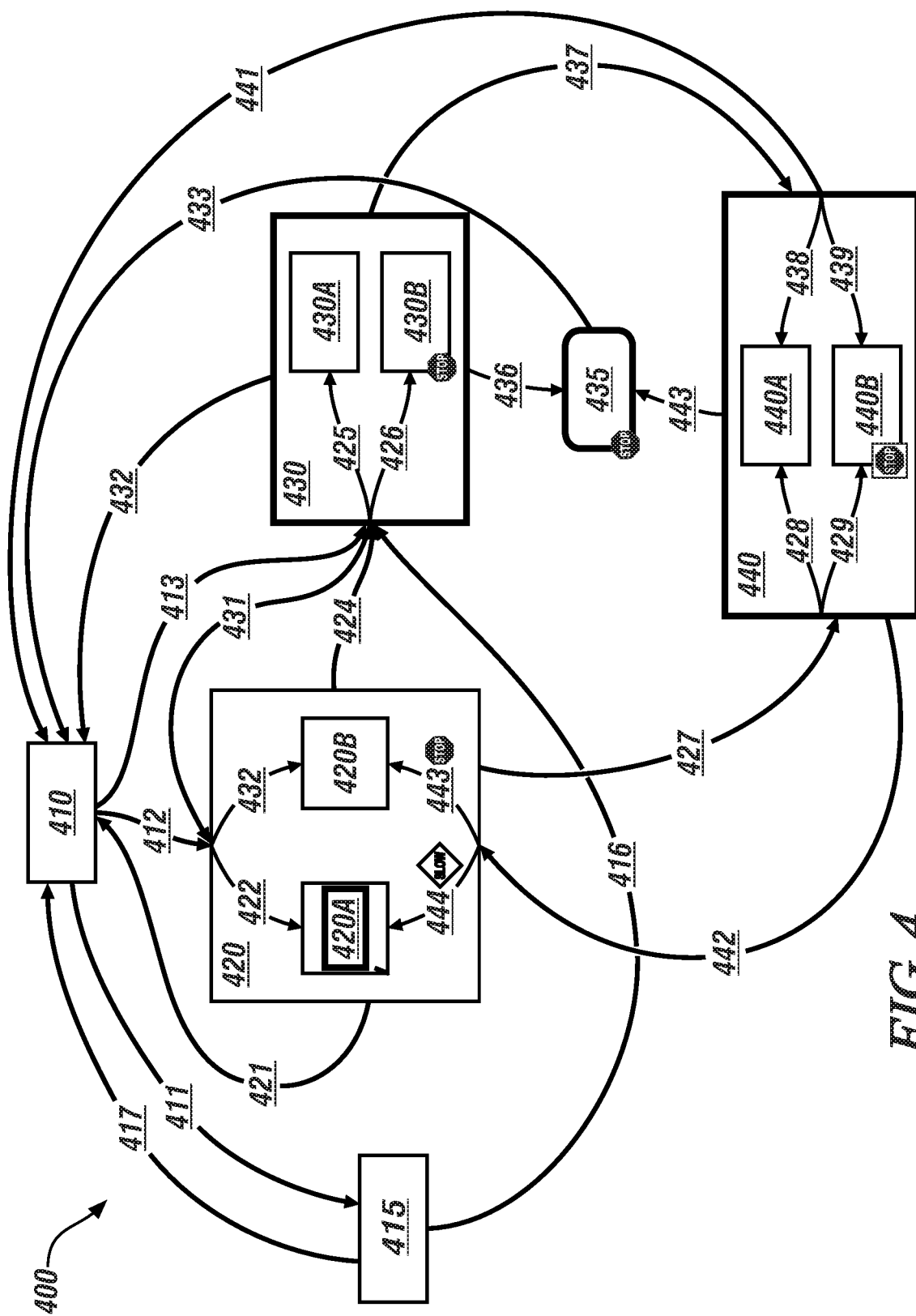
FIG. 4 schematically illustrates a braking state control diagram for controlling an autonomous braking system of a vehicle, in accordance with the disclosure.

FIG. 4 schematically illustrates a braking state diagram 400 that is associated with operation of the vehicle 10 that is described with reference to FIGS. 1 and 2, including controlling operation of the autonomous braking system 62 and controlling operation of the braking event lamp 85. The elements of the braking state diagram 400 are implemented as routines and calibrations in the vehicle controller 50 or another controller to control the braking states of the autonomous braking system 62, with such routines being executed to periodically update the braking state, such as every 10 msec or another update rate.

For purposes of illustrating the concepts described herein, the subject vehicle 10 is operating on the travel lane 205 of the road surface that is described with reference to FIG. 3, including the first vehicle 210 travelling in front of the subject vehicle 10 and the second vehicle 220 travelling behind the subject vehicle 10. The subject vehicle 10, the first vehicle 210 and the second vehicle 220 are traveling in the same direction on the travel lane 205. The vehicle 10 is also referred to herein as a subject vehicle, and includes one or multiple spatial sensors 34, 36 the spatial monitoring controller 40, the wheel braking system 16, the autonomous braking system 62, and the braking event lamps 85. The spatial monitoring controller 40 can evaluate inputs from the spatial sensors 34, 36 to determine a linear range, relative speed, and trajectory of the vehicle 10 in view of each proximate remote object.

The braking state diagram 400 describes operation of the wheel braking system 16, the autonomous braking system 62, and the braking event lamps 85 in each of an inactive state 410, a brake pre-fill state 415, a driver braking assistance state 420, a first autonomic braking state 430, a second autonomic braking state 440, and a hold braking state 435. Parameters associated with transitioning between the aforementioned states include a gap-closing time (TTC), which may be separated into a front vehicle gap-closing time (TTC-f), and a rear vehicle gap-closing time (TTC-r), vehicle speed of the subject vehicle 10, and an operator braking command as input to the brake pedal 15.

The front vehicle gap-closing time (TTC-f) is instantaneously determined as the period of time it will take to close the first gap 215 between the subject vehicle 10 and the first vehicle 210 forward of the subject vehicle 10 based upon the present rates of speed and trajectories of the subject vehicle 10 and the first vehicle 210.

The rear vehicle gap-closing time (TTC-r) is instantaneously determined as the period of time it will take to close the second gap 225 between the subject vehicle 10 and the second vehicle 220 rearward of the subject vehicle 10 based upon the present rates of speed and trajectories of the subject vehicle 10 and the second vehicle 220.

When in the inactive state 410, there is no operator braking command via the brake pedal 15, and TTC-f and TTC-r are both greater than a first minimum threshold time. By way of a non-limiting example, the first minimum threshold time may be 3 seconds in one embodiment. In the inactive state 410, the wheel braking system 16 is inactive, the autonomous braking system 62 is inactive, and braking event lamps 85 are in the OFF state.

During operation in the inactive state 410, when TTC-f falls below the first minimum threshold time, and there is an operator braking command via the brake pedal 15, the braking state transitions to the driver braking assistance state 420 (421).

During operation in the inactive state 410, when TTC-f falls below the first minimum threshold time, but is greater than a second minimum threshold time and there is no operator braking command via the brake pedal 15, the braking state transitions to the brake pre-fill state 415 (411). By way of a non-limiting example, the second minimum threshold time may be 1.7 seconds in one embodiment. During the brake pre-fill state 415, the braking event lamps 85 may be activated to the first illuminated state 86 (SLOW') indicating the vehicle 10 is slowing, and the wheel brake mechanism is pre-filled, which means that fluidic pressure in the wheel braking system 16 is increased to a pressure level that is just below pressure associated with braking activation to reduce braking response time upon activation.

During operation in the inactive state 410, when TTC-f falls below the first minimum threshold time, and there is operator braking command via the brake pedal 15, the braking state transitions to operate in the driver braking assistance state 420 (412).

During operation in the inactive state 410, when TTC-f falls below the second minimum threshold time but greater than the third minimum threshold time, and there is no operator braking command via the brake pedal 15, the braking state transitions to operate in the first autonomic braking state 430 (413).

When operating in the brake pre-fill state 415, when TTC-f increases to be greater than the first minimum threshold time, the braking state transitions to the inactive state 410 (417).

When operating in the brake pre-fill state 415, when TTC-f decreases to be less than the second minimum threshold time, but greater than a third minimum threshold time, the braking state transitions to the first autonomic braking state 430 (416). By way of a non-limiting example, the third minimum threshold time may be 0.6 seconds in one embodiment.

When transitioning to operate in the driver braking assistance state 420, the front vehicle gap-closing time (TTC-f) and the rear vehicle gap-closing time (TTC-r) are compared. When the front vehicle gap-closing time (TTC-f) is less than or equal to the rear vehicle gap-closing time (TTC-r) (422, 444), an intelligent braking system operates to supplement the operator braking command via the brake pedal 15 by controlling the vehicle braking via the autonomous braking system 62 to slow the vehicle speed to avoid closing the first gap 215 between the subject vehicle 10 and the first vehicle 210 forward of the subject vehicle 10, and the braking event lamp 85 is activated to the first illuminated state 86 ('SLOW') (420A). When the front vehicle gap-closing time (TTC-f) is greater than the rear vehicle gap-closing time (TTC-r) (423, 443), the intelligent braking system operates to supplement the operator braking command via the brake pedal 15 by executing a modulated braking process to control vehicle braking via the autonomous braking system 62 to slow the speed of the subject vehicle 10 to control closing the first gap 215 between the subject vehicle 10 and the first vehicle 210 forward of the subject vehicle 10 simultaneously with controlling the closing the second gap 225 between the subject vehicle 10 and the second vehicle 220 rearward of the subject vehicle 10. During this operation, the braking event lamp 85 is activated to the second illuminated state 87 ('STOP') (420B). The modulated braking process includes controlling the vehicle braking via the autonomous braking system 62 to slow the vehicle speed such that the front vehicle gap-closing time (TTC-f) reaches a minimum threshold time at the same time that the rear vehicle gap-closing time (TTC-r) reaches the same minimum threshold time. In one embodiment, the minimum threshold time is 0.3 seconds.

When operating in the driver braking assistance state 420, when the gap-closing time (TTC) increases to be greater than the first minimum time threshold, the braking state transitions to the inactive state 410 (421).

When operating in the driver braking assistance state 420, when the gap-closing time (TTC) increases to be greater than the third minimum threshold time, but less than the second minimum threshold time, and there is no operator braking command via the brake pedal 15, the braking state transitions to the first autonomic braking state 430 (424).

When operating in the driver braking assistance state 420, when the gap-closing times (TTC) decrease to be less than the third minimum threshold time and there is no operator braking command via the brake pedal 15, the braking state transitions to the second autonomic braking state 440 (427).

When transitioning to operate in the first autonomic braking state 430, the front vehicle gap-closing time (TTC-f) and the rear vehicle gap-closing time (TTC-r) are compared. When the front vehicle gap-closing time (TTC-f) is less than or equal to the rear vehicle gap-closing time (TTC-r) (425), the intelligent braking system operates to control the vehicle braking via the autonomous braking system 62 to slow the vehicle speed to avoid closing the first gap 215 between the subject vehicle 10 and the first vehicle 210 forward of the subject vehicle 10 (430A). When the front vehicle gap-closing time (TTC-f) is greater than the rear vehicle gap-closing time (TTC-r) (426), the intelligent braking system controls the vehicle braking via the autonomous braking system 62 to slow the speed of the subject vehicle 10 to control closing the first gap 215 between the subject vehicle 10 and the first vehicle 210 forward of the subject vehicle 10 simultaneously with controlling the closing the second gap 225 between the subject vehicle 10 and the second vehicle 220 rearward of the subject vehicle 10. During this operation, the braking event lamp 85 is activated to the second illuminated state 87 (STOP') (430B).

When operating in the first autonomic braking state 430, when the gap-closing time (TTC) is greater than the first minimum time threshold, the braking state transitions to the inactive state 410 (432).

When operating in the first autonomic braking state 430, when the gap-closing time (TTC) is less than the first minimum time threshold and the operator commands braking via the brake pedal 15, the braking state transitions to the driver braking assistance state 420 (431).

When operating in the first autonomic braking state 430, when the gap-closing time (TTC) is less than the third minimum time threshold and the operator is not commanding braking via the brake pedal 15, the braking state transitions to the second autonomic braking state 430 (437).

When operating in the first autonomic braking state 430, when the vehicle speed is less than a minimum speed, the braking state transitions to the hold braking state 435, and the braking event lamp 85 is activated to the second illuminated state 87 (STOP') (436). By way of a non-limiting example, the minimum speed may be 1.5 m/s in one embodiment.

When transitioning to operate in the second autonomic braking state 440, the front vehicle gap-closing time (TTC-f) and the rear vehicle gap-closing time (TTC-r) are compared. When the front vehicle gap-closing time (TTC-f) is less than or equal to the rear vehicle gap-closing time (TTC-r) (428, 438), the intelligent braking system operates to control the vehicle braking via the autonomous braking system 62 to slow the vehicle speed to avoid closing the first gap 215 between the subject vehicle 10 and the first vehicle 210 forward of the subject vehicle 10 (440A). When the front vehicle gap-closing time (TTC-f) is greater than the rear vehicle gap-closing time (TTC-r) (429, 439), the intelligent braking system operates to control the vehicle braking via the autonomous braking system 62 to slow the speed of the subject vehicle 10 to control closing the first gap 215 between the subject vehicle 10 and the first vehicle 210 forward of the subject vehicle 10 simultaneously with the control of the closing the second gap 225 between the subject vehicle 10 and the second vehicle 220 rearward of the subject vehicle 10. During this operation, the braking event lamp 85 is activated to the third illuminated state 88 (STOP') (440B).

When operating in the second autonomic braking state 440, when the gap-closing time (TTC) is greater than the first minimum time threshold, the braking state transitions to the inactive state 410 (441).

When operating in the second autonomic braking state 440, when the gap-closing time (TTC) is less than the first minimum time threshold and the operator commands braking via the brake pedal 15, the braking state transitions to the driver braking assistance state 420 (442).

When operating in the second autonomic braking state 440, when the vehicle speed is less than the minimum speed, the braking state transitions to the hold braking state 435, and the braking event lamp 85 is activated to the second illuminated state 87 (' STOP') (443).

When operating in the hold braking state 435, when the operator commands braking via the brake pedal 15, the braking state transitions to the inactive state 410 (433).

During operation in each of the prefill state 415, the driver braking assistance state 420, the first autonomic braking state 430, and the second autonomic braking state 440, the vehicle controller 50 or another of the controllers may communicate via the HMI device 60, the haptic device 19 of the driver seat 18, or by another device to communicate an impending change in the braking state to the vehicle operator. Furthermore, the vehicle controller 50 may communicate, via the telematics controller 75, the impending change in the braking state of the subject vehicle 10 to surrounding vehicles including the first vehicle 210 forward of the subject vehicle 10 and the second vehicle 220 rearward of the subject vehicle 10.

The concepts described herein relate to controlling the autonomous braking system 62 for an embodiment of the vehicle 10 by adjusting the speed of the vehicle 10 in a manner that takes into account both a gap-closing time associated with a forward vehicle and a gap-closing time associated with a rearward vehicle, and also gives notice to a rearward vehicle of the operation of the autonomous braking system of the vehicle.

The concepts may leverage existing on-vehicle components such as a rear radar to detect a rearward vehicle, and use braking event lamps and V2x communications to communicate with other road users about an impending braking event.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A control system for a subject vehicle, comprising:
   an autonomous braking system;
   a forward monitoring sensor and a rearward monitoring sensor;
   a controller, in communication with the forward monitoring sensor and the rearward monitoring sensor, and operatively connected to the autonomous braking system, the controller including an instruction set, the instruction set executable to:
   determine a speed of the subject vehicle;
   monitor, via the forward monitoring sensor, a first speed of a first vehicle travelling in front of the subject vehicle;
   monitor, via the rearward monitoring sensor, a second speed of a second vehicle travelling rearward of the subject vehicle;

determine a first gap-closing time based upon the speed of the subject vehicle and the first speed of the first vehicle, wherein the first gap-closing time is associated with a first gap between the subject vehicle and the first vehicle;

determine a second gap-closing time based upon the speed of the subject vehicle and the second speed of the second vehicle, wherein the second gap-closing time is associated with a second gap between the subject vehicle and the second vehicle; and control, via the autonomous braking system, the speed of the subject vehicle based upon the first gap-closing time and the second gap-closing time when one of the first gap-closing time or the second gap-closing time is less than a first threshold time.

2. The control system of claim 1, wherein the instruction set executable to control, via the autonomous braking system, the speed of the subject vehicle based upon the first gap-closing time and the second gap-closing time comprises the instruction set executable to control, via the autonomous braking system, the speed of the subject vehicle such that the first gap-closing time equals a minimum threshold time at the same time that the second gap-closing time equals the minimum threshold time.

3. The control system of claim 1, wherein the forward monitoring sensor and the rearward monitoring sensor comprise a single sensor that is arranged to monitor a travel lane that is forward of the subject vehicle and a travel lane to the rear of the subject vehicle.

4. The control system of claim 3, wherein the single sensor comprises a lidar sensor.

5. The control system of claim 3, wherein the single sensor comprises a radar sensor.

6. The control system of claim 1, wherein the forward monitoring sensor and the rearward monitoring sensor each comprises a radar sensor, a lidar sensor, or a camera.

7. The control system of claim 1, further comprising a rearward-facing braking event lamp, wherein the braking event lamp is controllable to one of a first illuminated state indicating the subject vehicle is slowing, a second illuminated state indicating the subject vehicle is stopping, or a third illuminated state indicating the subject vehicle is urgently stopping;

wherein the controller is operatively connected to the braking event lamp; and wherein the instruction set is executable to control the braking event lamp to one of the first, second or third illuminated states when the second gap-closing time is less than the first threshold time.

8. The control system of claim 1, further comprising a driver's seat disposed in the subject vehicle and including a haptic device;

wherein the controller is operatively connected to the haptic device; and wherein the instruction set is executable to activate the haptic device when the second gap-closing time is less than the threshold time.

9. The control system of claim 1, further comprising a vehicle-to-vehicle (V2V) communication system;

wherein the instruction set is executable to communicate, via the V2V communication system, with the first vehicle and the second vehicle based upon the first gap-closing time and the second gap-closing time.

10. A control system for a subject vehicle operating in a travel lane, comprising:

an autonomous braking system;

a rearward-facing braking event lamp, wherein the braking event lamp is controllable to a first illuminated state indicating the subject vehicle is slowing, a second illuminated state indicating the subject vehicle is stopping, and a third illuminated state indicating the subject vehicle is urgently stopping;

a forward monitoring sensor and a rearward monitoring sensor;

a controller, in communication with the forward monitoring sensor and the rearward monitoring sensor, and operatively connected to the autonomous braking system and the braking event lamp, the controller including an instruction set, the instruction set executable to:

determine a speed of the subject vehicle;

monitor, via the forward monitoring sensor, a first speed of a first vehicle travelling in the travel lane that is forward of the subject vehicle;

monitor, via the rearward monitoring sensor, a second speed of a second vehicle travelling in the travel lane to the rear of the subject vehicle;

determine a first gap-closing time based upon the speed of the subject vehicle and the first speed of the first vehicle, wherein the first gap-closing time is associated with a first gap between the subject vehicle and the first vehicle;

determine a second gap-closing time based upon the speed of the subject vehicle and the second speed of the second vehicle, wherein the second gap-closing time is associated with a first gap between the subject vehicle and the second vehicle;

control the braking event lamp to one of the first, second or third illuminated states when the second gap-closing time is less than a first threshold time; and control, via the autonomous braking system, the speed of the subject vehicle based upon the first gap-closing time and the second gap-closing time when one of the first gap-closing time or the second gap-closing time is less than a second threshold time, wherein the second threshold time is less than the first threshold time.

11. The control system of claim 10, wherein the instruction set executable to control, via the autonomous braking system, the speed of the subject vehicle based upon the first gap-closing time and the second gap-closing time comprises the instruction set executable to control, via the autonomous braking system, the speed of the subject vehicle such that the first gap-closing time equals a minimum threshold time at the same time that the second gap-closing time equals the minimum threshold time.

12. The control system of claim 10, wherein the forward monitoring sensor and the rearward monitoring sensor comprise a single sensor that is arranged to monitor the travel lane that is forward of the subject vehicle and the travel lane to the rear of the subject vehicle.

13. The control system of claim 12, wherein the single sensor arranged to monitor the travel lane that is forward of the subject vehicle and to the rear of the subject vehicle comprises a lidar sensor.

14. The control system of claim 13, wherein the single sensor arranged to monitor the travel lane forward of the subject vehicle and rearward of the subject vehicle comprises a radar sensor.

15. The control system of claim 10, further comprising a vehicle-to-vehicle (V2V) communication system;

wherein the instruction set is executable to communicate, via the V2V communication system, with the first vehicle and the second vehicle based upon the first gap-closing time and the second gap-closing time.

16. A control system for a subject vehicle operating in a travel lane, comprising:
an autonomous braking system;
a distance monitoring sensor arranged to monitor forward and rearward of the vehicle;
a controller, in communication with the distance monitoring sensor, and operatively connected to the autonomous braking system, the controller including an instruction set, the instruction set executable to:
determine a speed of the subject vehicle;
monitor, via the distance monitoring sensor, a first speed of a first vehicle travelling in a travel lane that is forward of the subject vehicle;
monitor, via the distance monitoring sensor, a second speed of a second vehicle travelling in the travel lane rearward of the subject vehicle;
determine a first gap-closing time based upon the speed of the subject vehicle and the first speed of the first vehicle, wherein the first gap-closing time is associated with a first gap between the subject vehicle and the first vehicle;
determine a second gap-closing time based upon the speed of the subject vehicle and the second speed of the second vehicle, wherein the second gap-closing time is associated with a second gap between the subject vehicle and the second vehicle; and
control, via the autonomous braking system, the speed of the subject vehicle based upon the first gap-closing time and the second gap-closing time when one of the first gap-closing time or the second gap-closing time is less than a first threshold time.

17. The control system of claim 16, wherein the instruction set executable to control, via the autonomous braking system, the speed of the subject vehicle based upon the first gap-closing time and the second gap-closing time comprises the instruction set executable to control, via the autonomous braking system, the speed of the subject vehicle such that the first gap-closing time equals a minimum threshold time at the same time that the second gap-closing time equals the minimum threshold time.

18. The control system of claim 16, wherein the distance monitoring sensor arranged to monitor the travel lane forward of the subject vehicle and rearward of the subject vehicle comprises one of a radar sensor, a lidar sensor, or a camera.

19. The control system of claim 16, further comprising a rearward-facing braking event lamp, wherein the braking event lamp includes a first illuminated state indicating the subject vehicle is slowing, a second illuminated state indicating the subject vehicle is stopping, and a third illuminated state indicating the subject vehicle is urgently stopping;
wherein the controller is operatively connected to the braking event lamp; and
wherein the instruction set is executable to control the braking event lamp to one of the first, second or third illuminated states when the second gap-closing time is less than the first threshold time.

20. The control system of claim 16, further comprising a driver's seat disposed in the subject vehicle and including a haptic device;
wherein the controller is operatively connected to the haptic device; and
wherein the instruction set is executable to activate the haptic device when the second gap-closing time is less than the threshold time.

* * * * *